US010469517B1

(12) United States Patent
Higbee et al.

(10) Patent No.: US 10,469,517 B1
(45) Date of Patent: Nov. 5, 2019

(54) CENTRALIZED SECURITY FOR CONNECTED DEVICES

(71) Applicant: Wells Fargo Bank, N.A., San Francisco, CA (US)

(72) Inventors: Dale Higbee, Chandler, AZ (US); Christopher Charles Perez, Glendale, AZ (US); Kathryn A. Glaser, Chandler, AZ (US); Gabriel R. Rojas, Chandler, AZ (US); Timothy Bonner Byrd, Huntersville, NC (US); Ward P. Fontenot, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 353 days.

(21) Appl. No.: 15/589,233

(22) Filed: May 8, 2017

(51) Int. Cl.
*H04L 29/06* (2006.01)

(52) U.S. Cl.
CPC ................................ *H04L 63/1433* (2013.01)

(58) Field of Classification Search
CPC ........... H04W 12/08; H04W 12/00512; H04W 12/02; H04W 12/1208; H04L 63/20; H04L 63/10; G06F 21/606; G06F 21/6218
See application file for complete search history.

(56) References Cited

U.S. PATENT DOCUMENTS 8,984,643 B1 * 3/2015 Krisher ............... H04L 63/1433 726/25
2006/0101517 A1 * 5/2006 Banzhof ............... G06F 21/577 726/25
2014/0241354 A1 8/2014 Shuman et al.
(Continued)

FOREIGN PATENT DOCUMENTS

CN 102025577 A 4/2011
CN 104618317 A 5/2015

OTHER PUBLICATIONS

Dickson., "Why ioT Security is So Critical," Crunch Network, TechCrunch, accessed from https://techcrunch.com/2015/10/24/why-iot-security-is-so-critical/, Oct. 24, 2015, 15 pp.
(Continued)

*Primary Examiner* — Brian F Shaw
(74) *Attorney, Agent, or Firm* — Shumaker & Sieffert, P.A.

(57) ABSTRACT

Techniques are described that generally relate to centralized vulnerability discovery and management of disparate network-connected devices. A computing device connected to a network determines vulnerabilities for devices connected to the network. The computing device identifies the devices connected to the network and determines vulnerability information for the network-connected devices using one or more remote sources of vulnerability information. For example, the computing device may access websites containing vulnerability or security information, e.g., by performing web searches on a periodic basis, subscribing to one or more web-based feeds of vulnerability information, or the like. The computing device performs a variety of operations (e.g., ranking vulnerabilities, applying patches, sending notifications, or the like) for the network-connected devices based on the vulnerability information.

20 Claims, 3 Drawing Sheets

(56) References Cited

U.S. PATENT DOCUMENTS

| | | | |
|---|---|---|---|
| 2014/0244825 | A1 | 8/2014 | Cao et al. |
| 2015/0117639 | A1 | 4/2015 | Feekes |

OTHER PUBLICATIONS

Grau., "How to Build a Safer Internet of Things," IEEE Spectrum, accessed from http://spectrum.ieee.org/telecom/security/how-to-build-a-safer-internet-of-things, Feb. 25, 2015, 6 pp.
Horowitz., "How-To Testing for vulnerable IoT devices," Computer World, accessed from http://www.computerworld.com/article/3134092/networking/testing-for-vulnerable-iot-devices.html, Oct. 22, 2016, 4 pp.
Varma., "On the features and challenges of security and privacy in distributed internet of things," accessed from http://web.mst.edu/~cetinkayae/teaching/CPE6510Spring2016/AVC_2.pdf, Mar. 24, 2016, 21 pp.

* cited by examiner

CENTRALIZED SECURITY FOR CONNECTED DEVICES

TECHNICAL FIELD

The invention relates to network security for networked computing devices.

BACKGROUND

A network may include a variety of disparate devices. For example, a home network may include a wide variety of devices such as personal computing devices including desktop computers, laptop computers, mobile telephones, and gaming devices. In addition, a variety of home appliances, such as thermostats, refrigerators, washing machines, ovens, toasters, lights, sprinkler systems, or other devices may also be able to connect to the network. Such network-connected devices may be referred to as "smart" devices or "Internet of Things" devices. The devices may be subject to a variety of different vulnerabilities, e.g., a weakness or security flaw that a party may exploit with potentially harmful results.

SUMMARY

The techniques of this disclosure generally relate to centralized vulnerability discovery and management of disparate network-connected devices. According to aspects of this disclosure, a computing device connected to a network determines vulnerabilities for devices connected to the network. The computing device identifies the devices connected to the network and determines vulnerability information for the network-connected devices using one or more remote sources of vulnerability information. For example, the computing device may access websites containing vulnerability or security information, e.g., by performing web searches on a periodic basis, subscribing to one or more web-based feeds of vulnerability information, or the like. The computing device performs a variety of operations (e.g., ranking vulnerabilities, applying patches, sending notifications, or the like) for the network-connected devices based on the vulnerability information. In this way, the techniques may enhance efficiency by providing a centralized vulnerability discovery and management source that is capable of managing a wide variety of network-connected devices.

In an example, a computer-implemented method comprises determining, by a computing device configured to communicate with a plurality of connected computing devices, characteristic data for respective connected computing devices of the plurality of connected computing devices; determining, based on the characteristic data, vulnerability information for the respective connected computing devices, wherein determining the vulnerability information comprises accessing one or more remote sources of information; and performing at least one operation based on the vulnerability information.

In another example, a device comprises a memory configured to store characteristic data for respective connected computing devices of a plurality of connected computing devices connected to a network; and one or more processors configured to communicate with the memory, wherein the one or more processors are further configured to: determine the characteristic data for the respective connected computing devices of the plurality of connected computing devices; determine, based on the characteristic data, vulnerability information for the respective connected computing devices, wherein, to determine the vulnerability information, the one or more processors are configured to access one or more remote sources of information; and perform at least one operation based on the vulnerability information.

In another example, a non-transitory computer-readable medium has instructions stored thereon that, upon execution, cause one or more processors to determine characteristic data for respective connected computing devices of a plurality of connected computing devices connected to a network; determine, based on the characteristic data, vulnerability information for the respective connected computing devices, wherein, to determine the vulnerability information, the instructions cause the one or more processors to access one or more remote sources of information; and perform at least one operation based on the vulnerability information.

The details of one or more examples of the disclosure are set forth in the accompanying drawings and the description below. Other features, objects, and advantages of the disclosure will be apparent from the description and drawings, and from the claims.

DETAILED DESCRIPTION

A wide variety of network-connected devices may connect to a home network. For example, the network-connected devices may connect to a Wi-Fi network established using a modem and a wireless router. Network-connected devices may include appliances (e.g., thermostats, refrigerators, washer/dryer, or the like), televisions, smartphones, smartwatches, IP cameras, or other devices. The network-connected devices may operate using a variety of operating systems and communication protocols, which may result in different vulnerabilities for each device.

The techniques of this disclosure generally relate to centralized vulnerability discovery and management of disparate network-connected devices. According to aspects of this disclosure, a computing device connected to a network determines vulnerabilities for devices connected to the network. The computing device identifies the devices connected to the network and determines vulnerability information for the devices using one or more remote sources of vulnerability information. For example, the computing device may access websites containing vulnerability or security information, e.g., by performing web searches on a periodic basis, subscribing to one or more web-based feeds of vulnerability information, or the like.

According to aspects of this disclosure, the computing device performs one or more operations based on the determined vulnerability information. For example, the computing device may output a visual representation of the vulnerability information. In some examples, the computing device may generate a list of vulnerability information, including software updates or patches for addressing the vulnerabilities indicated by the vulnerability information. The computing device may rank the list of vulnerability information, e.g., from most important/critical to least important. In some instances, the computing device may generate notifications based on the vulnerability information and transmit the notifications to one or more computing devices designated by an administrator of the computing device. In still other examples, the computing device may obtain and push patches that address the vulnerabilities indicated by the vulnerability information directly to the connected devices.

In this way, the techniques may enhance efficiency by providing a centralized vulnerability discovery and management source that is capable of managing a wide variety of network-connected devices. For example, a computing device may access a plurality of electronic repositories of vulnerability information associated with a wide variety of electronic devices, which may reduce the need to separately seek out and manage vulnerability information for each device.

Figure 1:
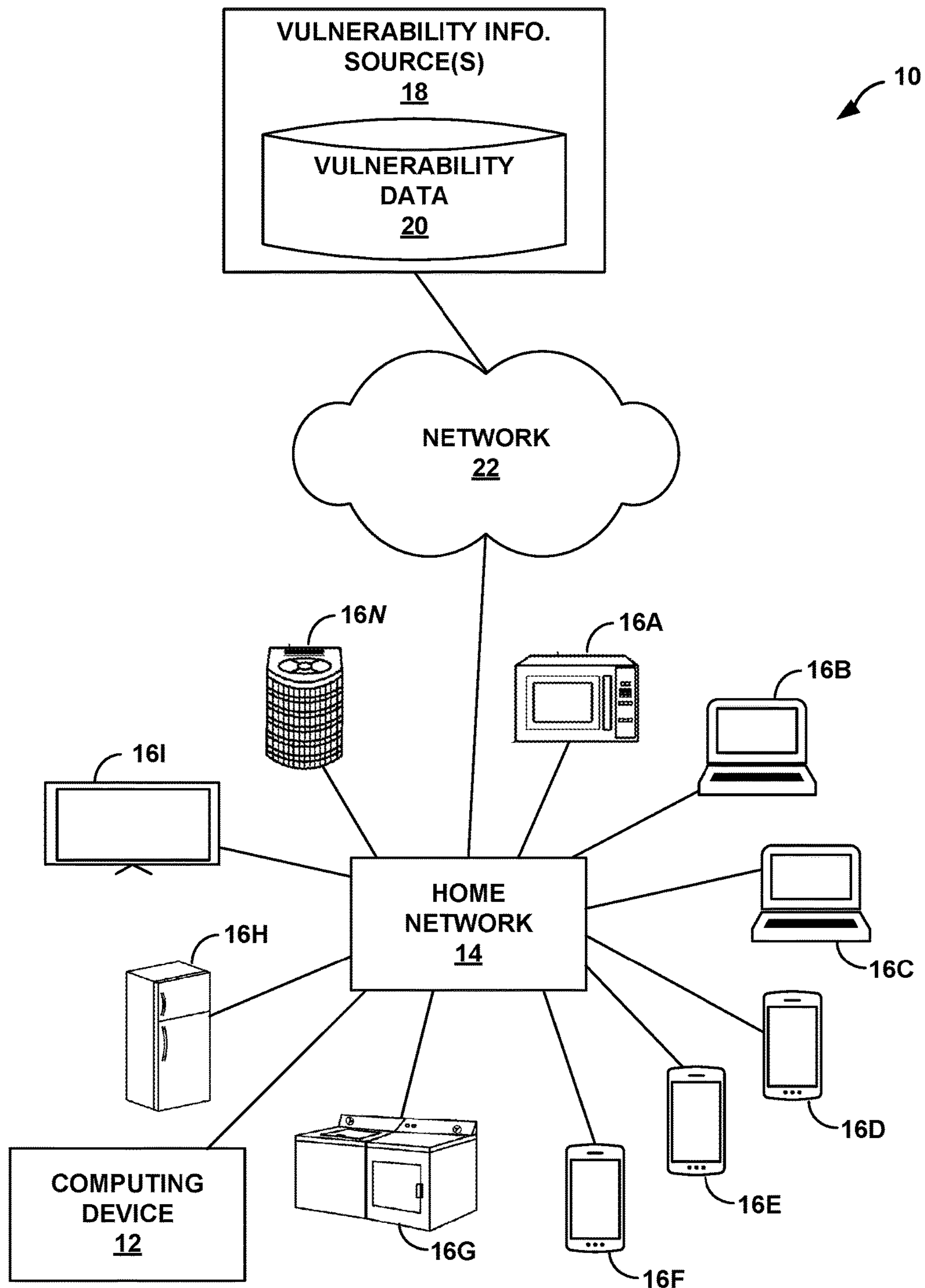
FIG. 1 is a block diagram illustrating an example computing system having a computing device for identification and management of vulnerabilities of connected computing devices, in accordance with the techniques of this disclosure.

FIG. 1 is a block diagram illustrating an example computing system 10 having a computing device 12 for identification and management of vulnerabilities of connected computing devices, in accordance with the techniques of this disclosure. The example of FIG. 1 includes computing device 12, home network 14, connected devices 16A-16N (collectively, connected devices 16), one or more vulnerability information sources 18 having vulnerability data 20, and network 22.

Computing device 12 may include a variety of devices for processing and/or manipulating data. For example, in general, the functionality of computing device 12 may be implemented in a device that includes one or more processing units, such as one or more microprocessors. The functionality of computing device 12 may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components.

While illustrated separately from home network 14 for purposes of explanation, it should be understood that, in some instances, computing device 12 may be component of home network 14. For example, as described in greater detail below, home network 14 may be a private network that is associated with a residence. In some instances, computing device 12 may be incorporated in a network hub, switch, router, or other component responsible for managing data of home network 14.

In some instances, home network 14 may be a private network that is associated with a residence of a user. However, while described with respect to a residential network, it should be understood that the techniques described herein are not strictly limited to residential applications. Home network 14 may comprise one or more of a virtual private network (VPN), a LAN, a WLAN (e.g., a Wi-Fi network), or a wireless personal area network (WPAN) (e.g., a Bluetooth® network). Home network 14 may provide access to network 22 for connected devices 16.

Network 22 may comprise any combination of public and private networks. That is, although illustrated as a single entity, network 22 may comprise any combination of public and/or private telecommunications networks, and any combination of computer or data networks and wired or wireless telephone networks. In some examples, network 22 may comprise one or more of a wide area network (WAN) (e.g., the Internet), a virtual private network (VPN), a LAN, a WLAN (e.g., a Wi-Fi network), a wireless personal area network (WPAN) (e.g., a Bluetooth® network), or the public switched telephone network (PTSN). Further, although specific network devices are not shown for ease of explanation, it should be understood that network 22 may include a variety of network and/or computing devices such as, for example, one or more switches, routers, hubs, gateways, security devices such as firewalls, servers, computer terminals, databases, wireless access points, bridges, cable modems, or other network devices.

Connected devices 16 may include any of a wide variety of electronic devices capable of connecting to a network such as the Internet. In some instances, connected devices may be referred to as "Smart" devices or "Internet of Things" devices. Example connected devices include portable devices such as a cellular phone or other wireless communication device, a laptop computer, a tablet, a portable gaming device, a portable media player, an e-book reader, a watch, as well as a non-portable device such as a desktop computer. Connected devices 16 may also include a variety of appliances such as thermostats, refrigerators, microwaves, washing machines, dryers, ovens, toasters, lights, sprinkler systems, or the like).

In the illustrated example, connected devices 16 include microwave oven 16A, personal computing devices 16B and 16C, mobile computing devices 16D-16F, washer/dryer 16G, refrigerator 16H, television 16I, and air conditioner 16N. As noted above, in other examples, connected devices 16 may include a wide variety of other devices. While connected devices 16 may typically communicate via the Internet, in other examples, connected devices 16 may communicate via any suitable network.

Vulnerability information sources 18 may be associated with a wide variety of sources of information that may be accessed via a network 22. For example, vulnerability information sources 18 may include computing systems of manufacturers of connected devices 16. In this example, vulnerability data 20 may be stored to databases maintained by the manufacturers and indicate vulnerabilities of connected devices 16 known to the manufacturer. In other examples, vulnerability information sources 18 may include a variety of other sources that are not associated with the manufacturer of connected devices 16. For example, vulnerability information sources 18 may be associated with non-profit or for-profit sources of cybersecurity information. Vulnerability information sources 18 may include trusted websites (which may have associated web feeds such as Rich Site Summary (RSS) feeds for publishing updated information), mailing lists, or other sources of security information.

Non-limiting examples of vulnerability information sources 18 associated with private vendors include the Microsoft Cyber Trust Blog, the Cisco Security Blog and RSS feed, or the SecureWorks Blog. Non-limiting examples of public vulnerability information sources include databases maintained by the Federal Bureau of Investigation (FBI), the website KrebsonSecurity (www.krebsonsecurity.com), the website DARKReading (www.darkreading.com), the SANS Internet Storm Center, the Defense Cyber Crime Center, the website ThreatBrief (www.threatbrief.com), databases maintained by Industrial Control Systems Cyber Emergency Response Team (ICS-CERT), the Bugtraq mailing list, or the like.

In some instances, vulnerability data 20 may also include firmware or software patches for addressing the vulnerabilities. For example, upon becoming aware of vulnerabilities, manufacturers of connected devices 16 (or other parties) may generate firmware or software updates that address the vulnerabilities so that the vulnerabilities can no longer be exploited. Such firmware or software updates may be included with vulnerability data 20 and may be available for download via network 22.

According to aspects of this disclosure, computing device 12 may determine vulnerability information for connected devices 16 and perform one or more operations based on the vulnerability information. In some examples, computing device 12 may initially perform a device discovery process to identify connected devices 16 connected to home network 14. For example, computing device 12 may poll any device connected to home network 14 to determine characteristic data for connected devices 16.

As described herein, characteristic data generally refers to any data that identifies connected devices 16 in a manner that allows computing device 12 to determine applicable vulnerability information. For example, characteristic data may identify one or more hardware or software components of connected devices 16. In some examples, characteristic data may include a name or feature that identifies firmware or software executed by connected devices 16. In addition, characteristic data may include firmware or software revision information of firmware or software executed by connected devices 16. In other examples, characteristic data may include a make, model, and/or serial number (or other identifying information, such as a product or feature name) associated with hardware of connected devices 16.

Computing device 12 may determine, based on the determined characteristic data, vulnerability information for respective connected devices 16. For example, computing device 12 may obtain vulnerability data 20 for each of connected devices 16 by accessing vulnerability information sources 18. As noted above, in some instances, vulnerability information sources 18 may be associated with a manufacturer of connected devices 16, while in other instances vulnerability information sources 18 may be associated with a wide variety of other public or private sources of security information.

According to aspects of this disclosure, computing device 12 may perform one or more operations based on the determined vulnerability information. For example, computing device 12 may output a visual representation of the vulnerability information, such as a graphical user interface (GUI) that includes a list of vulnerability information, including software or firmware updates or patches for addressing the vulnerabilities indicated by the vulnerability information. In some instances, computing device 12 may rank the list of vulnerability information, e.g., from most important/critical to least important.

In some examples, computing device 12 may generate notifications based on the vulnerability information. For example, computing device 12 may generate an electronic message that includes information regarding the vulnerabilities indicated by the vulnerability information. Computing device 12 may transmit the notifications to one or more computing devices, such as personal computing devices 16B and 16C or mobile computing devices 16D-16F, designated by an administrator of computing device 12.

In some instances, computing device 12 may generate and transmit notifications that permit a user of the computing device receiving the notifications to perform an action. For example, computing device 12 may transmit a notification that includes a description of the vulnerability, as well as an option to take the appropriate one of connected devices 16 offline, e.g., disconnect the appropriate one of connected devices 16 from network 22. In an example for purposes of illustration, computing device 12 may generate and transmit a short message service (SMS) or another text-based message to which a user may respond to perform the action.

As another example, as described herein, computing device 12 may obtain vulnerability data 20 that includes a firmware or software update for addressing a vulnerability. In such an example, computing device 12 may transmit a notification that includes a description of the vulnerability, as well as an option to push the update to the appropriate one of connected devices 16. Again, computing device 12 may generate and transmit a short message service (SMS) or another text-based message to which a user may respond to apply the update.

In still other examples, computing device 12 may obtain and push updates or patches included in vulnerability data 20 directly to connected devices 16. For example, upon determining that an update is available, computing device 12 may prompt the appropriate one of connected devices 16 to apply the update. Computing device 12 may download and transmit the update to the appropriate one of connected devices 16 or instruct the appropriate one of connected devices 16 to perform the download.

In some examples, the particular operations performed by computing device 12 may be configurable. For example, computing device 12 may generate an interface that allows an administrator of computing device 12 to individually configure the operation performed by computing device 12. In this example, the administrator of computing device 12 may select the operation that is performed based on the vulnerability information on a per-device basis.

Figure 2:
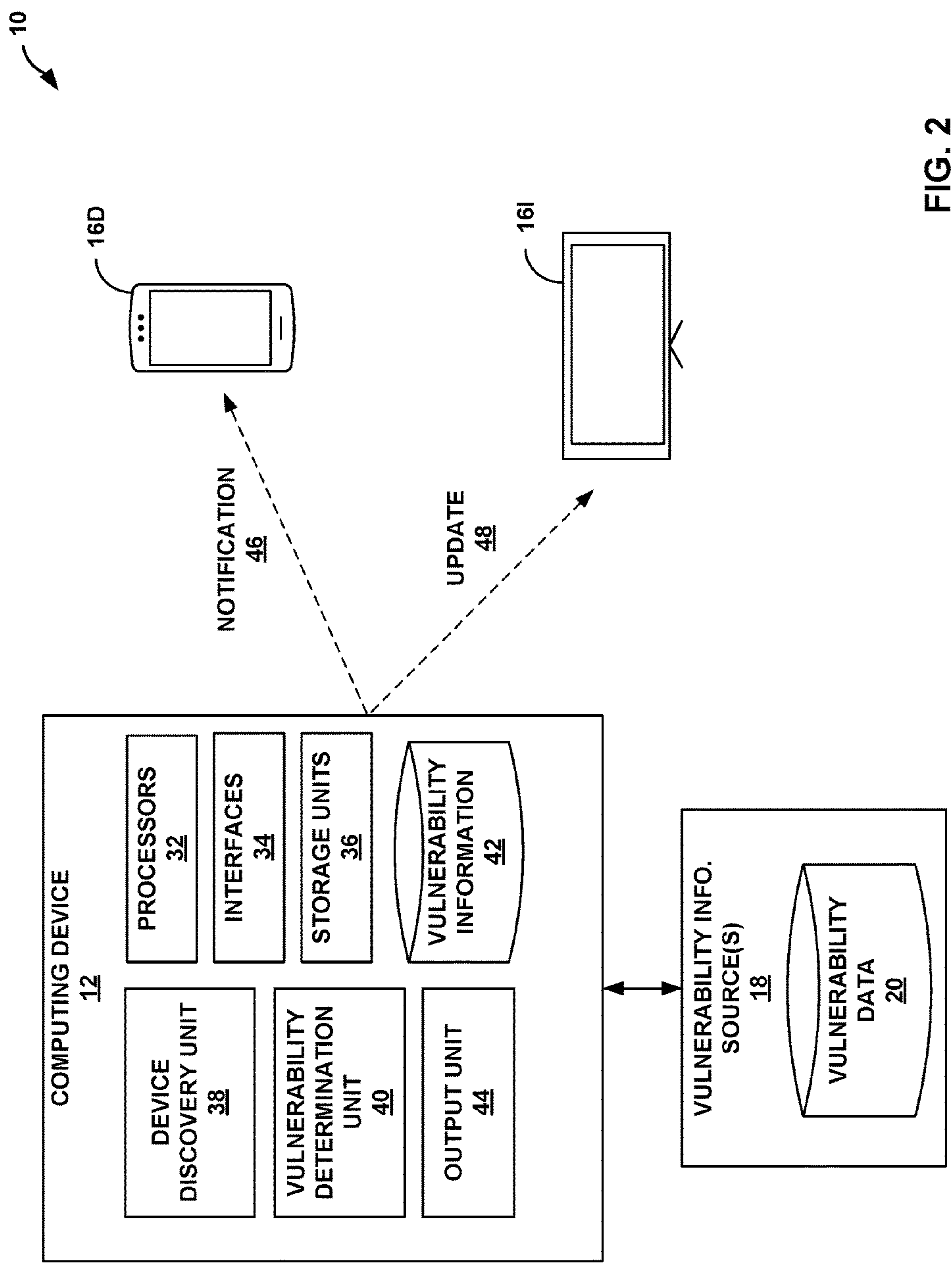
FIG. 2 is a block diagram illustrating the computing system of FIG. 1 in greater detail.

FIG. 2 is a block diagram illustrating several components of computing system 10 of FIG. 1 in greater detail. For example, computing device 12 includes one or more processors 32, one or more interfaces 34, and one or more storage units 36. In the example shown in FIG. 2, computing device 12 also includes device discovery unit 38, vulnerability determination unit 40, vulnerability information 42, and output unit 44. Although not shown in FIG. 2, the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

The architecture of computing device 12 (and, more broadly, computing system 10) illustrated in FIG. 2 is shown for exemplary purposes only. In other examples, computing system 10 and computing device 12 may be configured in a variety of other ways having additional, fewer, or alternative components than those shown in FIG. 2. For example, while computing device 12 is illustrated in the example of FIG. 2 as a single computing device, in other examples computing device 12 may have multiple components, e.g., in a distributed computing environment.

Processors 32, in one example, are configured to implement functionality and/or process instructions for execution within computing device 12. For example, processors 32 may be capable of processing instructions stored by storage units 36. Processors 32 may include, for example, microprocessors, digital signal processors (DSPs), application specific integrated circuits (ASICs), field-programmable gate array (FPGAs), or equivalent discrete or integrated logic circuitry.

Computing device 12 may utilize interfaces 34 to communicate with external devices via one or more wired or wireless connections. In some examples, computing device 12 utilizes interfaces 34 to communicate with external devices. Interfaces 34 may be network interfaces cards, universal serial bus (USB) interfaces, optical interfaces, or any other type of interfaces capable of sending and receiving information via TCP/IP. Examples of such network interfaces may include Ethernet, Wi-Fi, or Bluetooth radios.

Storage units 36 may store an operating system (not shown) that controls the operation of components of computing device 12. For example, the operating system may facilitate the communication of device discovery unit 38, vulnerability determination unit 40, and output unit 44 with processors 32, interfaces 34, and storage units 36. In some examples, storage units 36 are used to store program instructions for execution by processors 32. Storage units 36 may also be configured to store information within computing device 12 during operation. Storage units 36 may be used by software or applications (e.g., device discovery unit 38, vulnerability determination unit 40 and output unit 44) running on processors 32 of computing device 12 to temporarily store information during program execution.

Storage units 36 may include a computer-readable storage medium or computer-readable storage device. In some examples, storage units 36 include one or more of a short-term memory or a long-term memory. Storage units 36 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

Device discovery unit 38 may include instructions executed by one or more processors 32 of computing device 12 to perform the functions described with respect to device discovery unit 38. Device discovery unit 38 may initially perform a device discovery process to identify connected devices 16 connected to home network 14. For example, device discovery unit 38 may implement simple network management protocol (SNMP) or another protocol to collect characteristic information from connected devices 16. Again, characteristic data generally refers to any data that identifies connected devices 16 in a manner that allows computing device 12 to determine applicable vulnerability information.

In other examples, device discovery unit 38 may receive characteristic information from connected devices 16, e.g., in a communication session initiated by connected devices 16. For example, an administrator may configure connected devices 16 to transmit characteristic data to computing device 12. Device discovery unit 38 may identify connected devices 16 based on the received data.

Vulnerability determination unit 40 may include instructions executed by one or more processors 32 of computing device 12 to perform the functions described with respect to vulnerability determination unit 40. Vulnerability determination unit 40 may determine, based on the characteristic data, vulnerability information 42 for respective connected devices 16. Vulnerability information 42 generally refers to any data that indicates a computing vulnerability of connected devices 16. That is, vulnerability information 42 may be any data that indicates a potential weakness in connected devices 16 that, when exploited, results in a potentially negative impact to the confidentiality, integrity, or availability of connected devices 16. While shown as a separate component for purposes of illustration, in some instances, vulnerability information 42 may be stored by storage units 36.

Vulnerability determination unit 40 may determine vulnerability information 42 based on vulnerability data 20, e.g., data stored by other computing devices associated with a plurality of vulnerability information sources 18. That is, vulnerability determination unit 40 may store vulnerability data 20 relevant to connected devices 16 as vulnerability information 42. As noted above, vulnerability information sources 18 may be associated with a manufacturer of connected devices 16 or a wide variety of other public or private sources of security information. In some examples, an administrator of computing device 12 may provide an indication of vulnerability information sources 18 to vulnerability determination unit 40. For example, upon connecting one of connected devices 16 to home network 14, the administrator may register a website of a manufacturer of the connected device 16 with vulnerability information unit 40 as one of vulnerability information sources 18.

In other examples, vulnerability determination unit 40 may be responsible for determining vulnerability information sources 18 and associated vulnerability data 20. For example, vulnerability determination unit 40 may be configured to access a wide variety of websites or other vulnerability information sources 18. In this example, vulnerability determination unit 40 may, based on the characteristic data determined by device discovery unit 38, search for relevant vulnerability data 20 in a configurable set of vulnerability information sources 18. For instance, vulnerability determination unit 40 may be preconfigured to identify a set of vulnerability information sources 18, and an administrator of computing device 12 may alter the set of vulnerability information sources 18 based on the perceived trustworthiness of vulnerability information sources 18.

In some examples, vulnerability determination unit 40 may search for relevant vulnerability data 20 on a periodic basis. For example, vulnerability determination unit 40 may search for relevant vulnerability data 20 as frequently as necessary (e.g., every minute, 15 minutes, 30 minutes, or the like) to identify the most recent vulnerabilities of connected devices 16. Vulnerability determination unit 40 may additionally or alternatively be configured to subscribe to one or more web-based feeds associated with vulnerability information sources 18 or be pushed vulnerability data 20 from vulnerability information sources 18. Vulnerability determination unit 40 may determine the relevant vulnerability data 20 based on characteristic data from connected devices 16.

Output unit 44 may include instructions executed by one or more processors 32 of computing device 12 to perform the functions described with respect to output unit 44. According to aspects of this disclosure, output unit 44 may perform one or more operations based on vulnerability information 42. For example, output unit 44 may output a visual representation of the vulnerability information, such as a graphical user interface (GUI) that includes a list of vulnerability information 42, including software or firmware updates or patches for addressing the vulnerabilities indicated by vulnerability information 42.

In some instances, output unit 44 may rank the list of vulnerability information 42, e.g., from most important/critical to least important. For example, in some instances, output unit 44 may determine a device classification for each of connected devices 16. The device classification may be based on a device type or functionality of connected devices 16. For example, a personal computing device (such as personal computing devices 16B and 16C or mobile computing devices 16D-16F) may have a different classification than an appliance device (such as refrigerator 16H). In some instances, the device classification may be based on the type of data stored by connected devices 16. That is, connected devices 16 storing confidential or personal data may have a different classification than connected devices 16 storing benign operational data. In any case, output unit 44 may determine the ranking of vulnerability information 42 based on the determined device classification. For example, output unit 44 may rank vulnerability information 42 for certain device classifications (e.g., personal computing devices storing confidential or personal data) higher than other device classifications (e.g., appliance devices storing benign operational data).

Output unit 44 may additionally or alternatively determine the ranking of vulnerability information 42 based on a device ranking. For example, in some instances, output unit 44 may be configured to rank connected devices 16, e.g., bases on the type, functionality, or data stored by connected devices 16. In another example, an administrator of computing device 12 may provide an initial ranking of devices or modify an initial ranking determined by output unit 44.

In some examples, output unit 44 may generate one or more notifications 46 based on vulnerability information 42. For example, output unit 44 may generate an electronic message that includes information regarding vulnerabilities indicated by vulnerability information 42. Output unit 44 may transmit notification 46 to one or more connected devices, e.g., mobile computing device 16D, or another device designated by an administrator of computing device 12.

In some instances, output unit 44 may generate and transmit notifications 46 that permit a user of the connected device to receive notifications 46 to perform an action. For example, output unit 44 may transmit a notification that includes a description of the vulnerability, as well as an option to perform an action. For example, the action may be to disconnect the appropriate one of connected devices 16 from network 22, power down the appropriate one of connected devices 16, or perform any other action to reduce the potential for exploitation of the indicated vulnerability. In an example for purposes of illustration, output unit 44 may generate and transmit an SMS or other electronic message to which a user may respond to perform the action (e.g., "type 9 to disconnect the device from the network").

Output unit 44 may additionally or alternatively obtain vulnerability data 20 that includes a firmware or software update 48 (also referred to herein as a "patch") for addressing a vulnerability and store the updates as vulnerability information 42. Output unit 44 may push update 48 directly to connected devices 16. For example, upon determining that update 48 is available, output unit 44 may prompt television 16I (in the illustrated example) to apply update 48. In some instances, output unit 44 (or another component of computing device 12) may download the appropriate updates from websites of the manufacturers of connected devices 16 or from other trusted sources.

In some instances, prior to pushing update 48, output unit 44 may transmit a notification that includes a description of the vulnerability, as well as an option to push update 48. Again, output unit 44 may generate and transmit an electronic message to which a user may respond to apply update 48.

In some examples, the particular operations performed by output unit 44 may be configurable. For example, output unit 44 may generate an interface that allows an administrator of computing device 12 to individually configure the operation performed by computing device 12. In this example, the administrator of computing device 12 may select the operation that is performed based on the vulnerability information on a per-device basis.

In other examples, output unit 44 may determine the appropriate operation to perform from a set of operations (e.g., apply update, generate notification, take device offline, or the like) based on the criticality of vulnerability information 42. Criticality may be determined based on the source of vulnerability information 42. Output unit 44 may automatically apply critical updates (as designated by the manufacturer or another trusted party), but may simply generate a notification that an update is available for non-critical updates.

Figure 3:
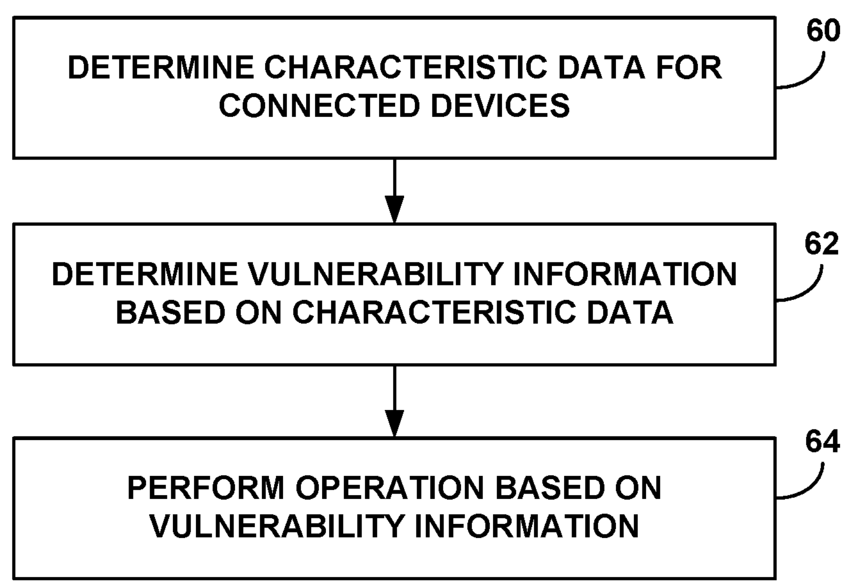
FIG. 3 is a flow diagram illustrating an example process for repair or replacement of a connected device, in accordance with the techniques of this disclosure.

FIG. 3 is a flow diagram illustrating an example process for maintenance, repair or replacement of a connected device, in accordance with the techniques of this disclosure. While described with respect to computing device 12 of the computing system 10 illustrated in FIGS. 1 and 2, it should be understood that the process described with respect to FIG. 3 may be carried out by a variety of computing devices.

In the illustrated example, computing device 12 determines characteristic data for respective connected computing devices 16 (60). Again, characteristic data generally refers to any data that identifies connected devices 16 in a manner that allows computing device 12 to determine applicable vulnerability information. For example, characteristic data may identify one or more hardware or software components or features of connected devices 16.

Computing device 12 determines, based on the characteristic data, vulnerability information 42 for the respective connected computing devices 16, where determining vulnerability information 42 includes accessing one or more remote vulnerability information sources 18 (62). Vulnerability information 42 may be any data that indicates a potential weakness in connected devices 16 that, when exploited, results in a potentially negative impact to the confidentiality, integrity, or availability of connected devices 16. Vulnerability information sources 18 may be associated with a wide variety of sources of information that may be accessed via a network 22. Hence, computing device 12 may determine, by searching vulnerability information sources 18 for relevant data based on the characteristic data, applicable vulnerability information 42 for connected devices 16.

Computing device 12 performs at least one operation based on the vulnerability information (64). For example, as described herein, computing device 12 may generate one or more notifications that provide information regarding vulnerabilities and/or that allow an administrator to take action. In other examples, computing device 12 may automatically perform one or more operations, e.g., such as pushing an update or taking connected devises 16 offline. In still other examples, computing device 12 may generate a ranking of vulnerability information 42 and present the ranking, thereby allowing an administrator to selectively address vulnerability information 42 for each of connected devices 16.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:

determining, by a computing device configured to communicate with a plurality of connected computing devices, characteristic data for respective connected computing devices of the plurality of connected computing devices;

determining, based on the characteristic data, vulnerability information for the respective connected computing devices, wherein determining the vulnerability information comprises accessing one or more remote sources of information;

determining, for the respective connected computing devices, a device classification, wherein the device classification is based on a type of data stored by the respective connected computing devices;

determining a ranking of vulnerabilities corresponding to the vulnerability information for the respective connected computing devices based on the determined device classification for the respective connected computing devices; and performing at least one operation based on the vulnerability information in accordance with the determined ranking.

2. The method of claim 1, wherein performing the at least one operation comprises:

generating a graphical user interface (GUI) comprising an indication of the vulnerabilities in the determined ranking.

3. The method of claim 1, wherein determining the device classification for the respective connected computing devices comprises determining a first device classification for a first computing device based on the first computing device storing confidential data and determining a second device classification for a second computing device based on the second computing device storing operational data; and wherein determining the ranking of vulnerabilities comprises ranking the vulnerability information for the first computing device having the first device classification higher than the vulnerability information for the second computing device having the second device classification.

4. The method of claim 1, further comprising:

determining, for the respective connected computing devices, a device ranking based on at least one of the device classification for the computing device or input from a user of the computing device; and wherein determining the ranking of vulnerabilities comprises determining the ranking of vulnerabilities based on the device ranking for the respective connected computing devices.

5. The method of claim 1, wherein performing the at least one operation comprises outputting a status notification for at least one connected computing device of the plurality of connected computing devices, the status notification indicating a vulnerability status of the at least one connected computing device.

6. The method of claim 1, wherein performing the at least one operation comprises:

obtaining, based on the vulnerability information for at least one computing device of the plurality of connected computing devices, a software patch associated with the vulnerability information; and transmitting, for installation by the at least one connected computing device, the software patch from the computing device to the at least one connected computing device.

7. The method of claim 6, wherein obtaining the software patch comprises accessing the software patch from an electronic source of a manufacturer of the at least one connected computing device based on the characteristic data of the at least one connected computing device.

8. The method of claim 1, wherein performing the at least one operation based on the vulnerability information comprises:

determining a criticality of the vulnerability information; and selecting, based on the criticality of the vulnerability information, the at least one operation from a set of operations.

9. The method of claim 1, wherein accessing the one or more remote sources comprises subscribing to one or more web-based feeds of vulnerability information and obtaining the vulnerability information from the one or more web-based feeds.

10. The method of claim 1, wherein accessing the one or more remote sources comprises performing, on a periodic basis, a plurality of web-based searches based on the characteristic data.

11. The method of claim 1, further comprising limiting the accessing of the one or more remote sources of information based on input received from a user of the computing device.

12. The method of claim 1, wherein the characteristic data comprises hardware characteristic data that indicates a make, a model number, or a serial number associated with hardware of the plurality of connected computing devices.

13. The method of claim 1, wherein the characteristic data comprises software characteristic data that indicates a firmware revision or a software revision associated with software of the plurality of connected computing devices.

14. A device comprising:

a memory configured to store characteristic data for respective connected computing devices of a plurality of connected computing devices connected to a network; and one or more processors configured to communicate with the memory, wherein the one or more processors are further configured to:

determine the characteristic data for respective connected computing devices of the plurality of connected computing devices;

determine, based on the characteristic data, vulnerability information for the respective connected computing devices, wherein, to determine the vulnerability information, the one or more processors are configured to access one or more remote sources of information;

determine, for the respective connected computing devices, a device classification, wherein the device classification is based on a type of data stored by the respective connected computing devices;

determine a ranking of vulnerabilities corresponding to the vulnerability information for the respective connected computing devices based on the determined device classification for the respective connected computing devices; and perform at least one operation based on the vulnerability information in accordance with the determined ranking.

15. The device of claim 14, wherein to perform the at least one operation, the one or more processors are configured to:

generate a graphical user interface (GUI) comprising an indication of the vulnerabilities in the determined ranking.

16. The device of claim 14, wherein to perform the at least one operation, the one or more processors are configured to output a status notification for at least one connected computing device of the plurality of connected computing devices, the status notification indicating a vulnerability status of the at least one connected computing device.

17. The device of claim 14, wherein to perform the at least one operation, the one or more processors are configured to:

obtain, based on the vulnerability information for at least one computing device of the plurality of connected computing devices, a software patch associated with the vulnerability information; and transmit, for installation by the at least one connected computing device, the software patch from the computing device to the at least one connected computing device.

18. The device of claim 14, wherein to perform the at least one operation, the one or more processors are configured to:

determine a criticality of the vulnerability information; and select, based on the criticality of the vulnerability information, the at least one operation from a set of operations.

19. The device of claim 14, wherein to access the one or more remote sources, the one or more processors are configured to subscribe to one or more web-based feeds of vulnerability information and obtain the vulnerability information from the one or more web-based feeds.

20. A non-transitory computer-readable medium having instructions stored thereon that, upon execution, cause one or more processors to:

determine characteristic data for respective connected computing devices of a plurality of connected computing devices connected to a network;

determine, based on the characteristic data, vulnerability information for the respective connected computing devices, wherein, to determine the vulnerability information, the instructions cause the one or more processors to access one or more remote sources of information;

determine, for the respective connected computing devices, a device classification, wherein the device classification is based on a type of data stored by the respective connected computing devices;

determine a ranking of vulnerabilities corresponding to the vulnerability information for the respective connected computing devices based on the determined device classification for the respective connected computing devices; and perform at least one operation based on the vulnerability information in accordance with the determined ranking.

* * * * *